Figure 1:
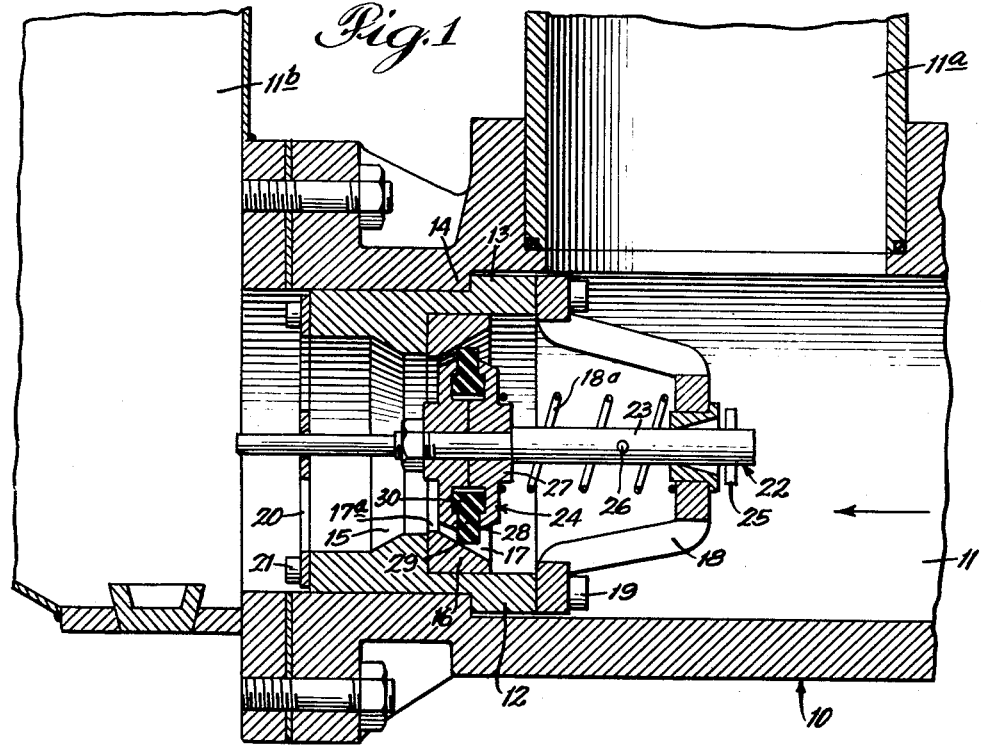

Aug. 23, 1960 L. H. HOBSON 2,949,928
VALVE
Filed Jan. 16, 1958 2 Sheets-Sheet 1

INVENTOR:
Lloyd H. Hobson,
BY Dawson, Tilton, Fallon & Lungmus,
ATTORNEYS.

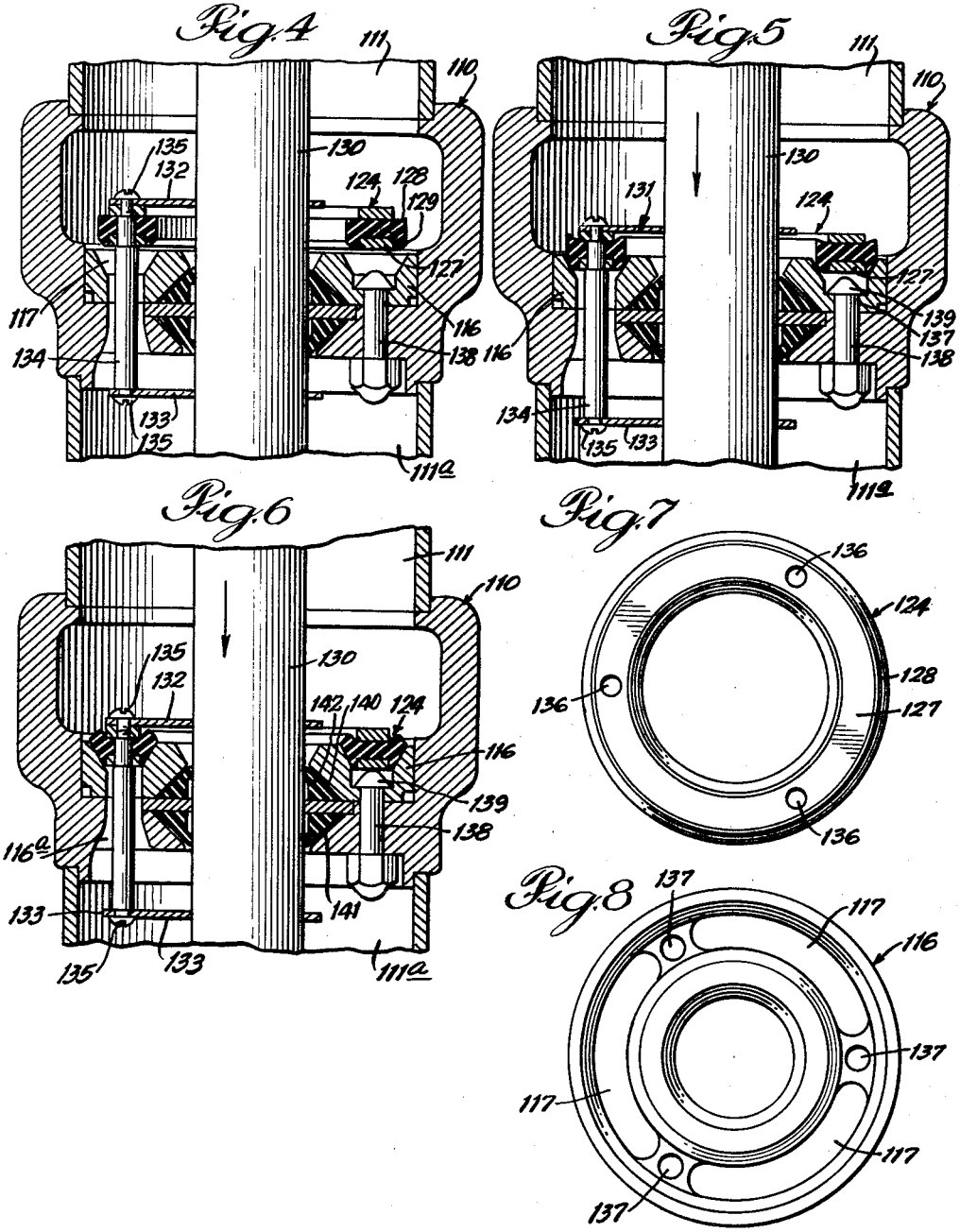

United States Patent Office 2,949,928
Patented Aug. 23, 1960

2,949,928
VALVE

Lloyd H. Hobson, Lemont, Ill., assignor to Plastering Development Center, Inc., Chicago, Ill., a corporation of Illinois Filed Jan. 16, 1958, Ser. No. 709,300

1 Claim. (Cl. 137—454.2)

This invention relates to a valve, and, more particularly, to a check valve useful in systems conducting paste-like materials.

The valve of this invention has particular utility in connection with checking the flow of material in material handling systems such as plastering machines. These machines are employed to provide a steady flow of cementitious or other aggregate-containing material for application to various structures. It can be appreciated that a steady, even flow of such a paste-like material is not only desirable to achieve the intended application, but is also mandatory if the machines are to be used at all. Where, for example, plaster is applied to a ceiling, an interruption in the steady flow may result in the stream of plaster not reaching the ceiling and creating, in effect, an umbrella, with the machine operator unfortunately standing beneath the umbrella of falling plaster. Important in achieving steady flow of paste-like materials, especially those containing particles such as aggregate or sand, are valves, particularly check valves.

A machine for applying a paste-like material and which includes a plurality of cylinder and piston units to provide a continuous stream of material, is shown in my copending application, Serial No. 697,899, filed November 21, 1957.

Check valves are employed in that machine to regulate the inflow and outflow of paste-like material from the pumping cylinders, and the valve of this invention finds utility in such a structural environment. Reference is hereby made to the above-mentioned copending application.

In the above-mentioned copending application, a pair of cylinder and piston units is shown, coupled to both a hopper source of material and a hose outlet for the material. The connections between the hopper and each of the cylinders are equipped with check valves, as are also the connections between the cylinders and the outlet hose. The valves are so arranged that during the intake stroke of the pistons, the check valves associated with the hopper are open, while the check valves associated with the hose are closed. During the pumping stroke of the pistons, the reverse is true.

A distinct problem has arisen in the use of check valves in such an environment, as well as in other systems conducting paste-like materials, in that the valves do not completely close. Frequently a particle will lodge between the valve element and the seat of the valve, preventing it from closing fully. Where, for example, this occurs in the check valve associated with the hopper connection to the cylinder during the pumping action of the piston, material, instead of being entirely forced into the hose, would also be forced back into the hopper, thus detracting from the evenness and steadiness of flow shown to be mandatory above. There are many other applications, however, where it is important for a check valve to be moved to a fully-closed position to be of any utility at all. In fact, a valve that does not operate to close fully fails to attain its primary objective and hence cannot be considered a check valve. The presence of discrete particles in a paste-like material flowing through the valve has placed many of the previously-employed valves in just this category. A particle lodged between the check valve element and its associated seat permits leakage to occur in the unwanted direction. Expedients employing yieldable or resilient elements have failed to solve this problem, since the pressures usually involved in flowing paste-like materials are also capable of extruding a resilient element through the opening in the valve seat. This is productive of an unusually high rate of wear if it is not productive of immediate failure. In any event, such expedients have proven both operationally and economically unfeasible.

Further, the achievement of anything but a complete closure of the valve is objectionable in a system conducting a paste-like material, since imperfect closure creates a straining action that tends to separate the liquid from the solid portion of the paste and thereby destroys the uniformity and homogeneity of the paste. Still further, to be useful in the regulation of pastes, the complete closure of the valve should be possible equally readily by both small and large pressures.

It is a general object of this invention to provide a valve which overcomes the difficulties outlined above. Another object is to provide a valve which is useful in systems conducting paste-like materials. Still another object is to provide a valve which will fully close to a liquid-tight condition under pressure exerted against it by a paste-like material. Still another object is to provide a valve that is operative to close off the flow of a paste-like material even when discrete particles are lodged between the valve element and its associated seat.

A further object is to provide a check valve useful in completely shutting off the flow of paste-like materials containing particles such as aggregate or sand. A still further object is to provide a check valve suitable for incorporation into an apparatus or system in which a paste-like material containing discrete particles is flowed, in which the valve is operative to close to an extent preventing separation of the fluid and solid components of the paste-like material.

Another object is to provide a valve including a tapered valve seat and a valve element having a rigid cylindrical portion and a resilient outer portion secured to the rigid cylindrical portion. A further object is to provide a valve of the character set forth in the object immediately preceding in which the resilient outer portion is provided with a circular leading edge. Yet another object is to provide a valve having a rigid central portion and a resilient outer portion that cooperates with a tapered valve seat when the two are brought into contact, to provide a wiping action to dislodge or envelop discrete particles entrained therebetween and which would otherwise prevent full closure of the valve. Other objects and advantages of this invention can be seen as the specification proceeds.

This invention, in illustrative embodiments, will be explained in conjunction with the accompanying drawing, in which—

Figure 2:
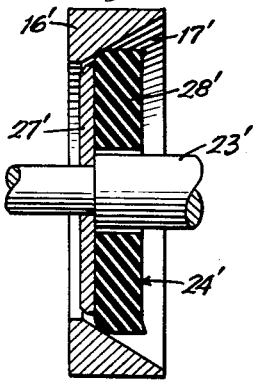
Figure 3:
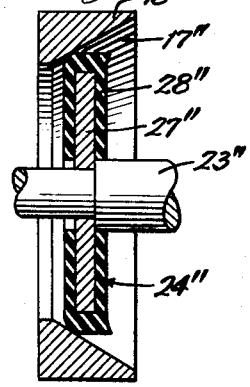

Fig. 1 is an elevational view, partially in section, of a valve embodying teachings of this invention and shown in an operative environment; Fig. 2 is an enlarged cross-sectional view of a valve constructed according to this invention and which shows a valve element alternative to the form depicted in Fig. 1; Fig. 3 is a view similar to Fig. 2 and shows yet another form of valve element; Fig. 4 is an elevational view, partially in section, of another embodiment of this invention; Figs. 5 and 6 are views similar to Fig. 4 but differ in showing the valve element in different operative positions; Fig. 7 is a bottom plan view of the valve element seen in Figs. 4–6 and Fig. 8 is a top plan view of the valve seat element seen in Figs. 4–6 and with which the valve element of Fig. 7 is adapted to mate to provide a valving action.

Referring now to the drawing, the numeral 10 designates generally a housing (only a portion of which is shown) in which a fluid material is adapted to flow. An apparatus in which a valve of the character described herein could be used is seen in my copending application, Serial No. 703,969 filed December 19, 1957, and entitled "Method and Apparatus for Applying a Paste-Like Material Containing a Gas."

Mounted within a flow passage 11 provided by housing 10 is a valve body 12 provided with a peripheral shoulder 13 which engages an internal shoulder 14 provided by the interior wall of housing 10 that defines flow passage 11. Valve body 12 is suitably secured in position within housing 10 by means not shown.

Valve body 12 is equipped with a passage 15 extending therethrough in which is mounted valve seat 16. Valve seat 16, in turn, is provided with a passage 17 extending through it which permits fluid to flow through valve body 12.

Secured to one end of valve body 12 and positioned over opening 15 is a spider 18 which is anchored to valve body 12 by bolts 19. The other end of valve body 12 (the left-hand end viewed in Fig. 1), is equipped with a disk-like bracket 20 suitably secured to valve body 12 by means of bolts 21.

Spider 18 and bracket 20 are each provided with a central bore which permits the slidable receipt of the moving portion 22 of the valve of this invention. The moving portion, which is generally designated 22, includes a stem 23, on which is fixedly mounted a circular valve element generally designated 24. Stem 23 is equipped with a pair of pins 25 and 26, which extend laterally from stem 23, and which serve to limit the reciprocal movement of movable portion 22. Interposed between valve element 24 and spider 18 is a coiled spring 18a. Flow of plaster through the valve body 12 can only be in the direction of left to right, as seen in Fig. 1, against the urging of the spring 18a. The limit to which element 24 can be retracted is fixed by pin 26, while the inward movement of element 24 into opening 17 of valve seat 16 is fixed by the abutment of pin 25 with spider 18.

The opening 17 in valve body 16 is tapered and thus, in effect, is a frusto-conical opening. In the illustration given, the extreme inner end of passage 17, designated 17a, is cylindrical in nature. Cooperating with the just-described opening 17 is valve element 24, which includes a rigid cylindrical center portion 27, and disposed about the central portion 27, a resilient outer portion 28. Preferably, the central portion 27 can be constructed of metal such as steel, while the resilient outer portion 28 may be constructed of rubber. Outer portion 28 is firmly secured to the central portion 27 and is equipped with a circular periphery, particularly the leading edge thereof such as is designated by the numeral 29. The securement of outer portion 28 to central portion 27 can be achieved in a number of ways. In Fig. 1, the outer portion 28 is equipped with an inner enlarged portion as at 30 which is received within a T-shaped groove in the periphery of central portion 27. In Figs. 2 and 3, alternative structures are shown. In Fig. 2, where like numerals are employed to designate corresponding structures except for the addition of a prime, the numeral 27' designates a rigid central portion which has bonded thereto a resilient outer portion designated 28'. As before, the central portion can be constructed of metal, while the resilient outer portion 28' can be constructed of rubber. In Fig. 2, the numeral 16' designates a valve seat, and the numeral 17' a passage extending therethrough. The valve element 24', which includes portion 27' and 28', is shown mounted on a stem 23' which can be identical in arrangement and mounting with stem 23 of Fig. 1.

In Fig. 3, the central portion of the valve element is also designated 27 but with the addition of a double prime. As in Figs. 1 and 2, a valve element 24" is fixedly mounted on stem 23" and is adapted to engage a tapered opening 17" provided by valve seat 16". The valve element 24" includes a rigid central portion 27" which is enveloped in a resilient outer portion 28".

In Fig. 1, valve element 24 is shown in a condition of just touching valve seat 16, while in Figs. 2 and 3, the valve element 24' or 24", as the case may be, has become firmly seated within the corresponding seat.

The structure shown in Fig. 1 or as modified by the inclusion of valve element 24' or 24" from Figs. 2 and 3 has been found to be exceptionally satisfactory in checking the flow of gas-containing paste-like material where the paste is made up of discrete particles such as would be found in plasters or other cementitious mixes. The structure shown has been found to overcome a vexatious problem in the handling of such materials which stems from the fact that discrete particles lodge between the valve element and valve seat to prevent perfect contact and sealing-off of flow. It is believed that the manner in which the valve of this invention solves the above-mentioned difficult problem can be more quickly appreciated from a brief description of the operation of the valve of this invention in an operative environment.

As mentioned before in connection with my above referred to copending application, such a valve as is shown here can be very satisfactorily employed in conjunction with a machine for applying paste-like materials such as plasters, cements, etc. Where such is the case, the housing 10 of Fig. 1 would interconnect a hopper, a piston and cylinder unit, and a hose. Flow passage 11 of housing 10 could communicate at the right-hand end thereof with a cylinder and piston unit. Flow passage 11 could also communicate through a laterally-disposed passage 11a shown at the top right-hand portion of Fig. 1 with a paste-applying hose. The structure designated 11b at the extreme left-hand portion of Fig. 1 could be part of a hopper with which flow passage 11 communicates and which communication is interrupted by means of the valve just described.

*Operation*

In an environment such as that just set down, a paste-like material can be drawn into flow passage 11 from hopper 11b by suitable piston movement of the piston and cylinder unit mentioned above but which is not shown. Similar inspiration of material from passage 11a would be prevented through the provision of a similar but oppositely-oriented valve in that passage. Upon reversal of the piston movement, valve element 24 seats to prevent discharge back into hopper 11b from chamber 11 of the material just previously inspirated from hopper 11b, but opens the just referred to oppositely-oriented valve in passage 11a to permit discharge of the previously inspirated material through a hose (not shown).

A valve of the character shown in Figs. 1–3 may conveniently have a frusto-conical opening 17 that tapers from a $2\frac{11}{16}$ inch diameter to a two-inch diameter, measured on the opposite sides of valve seat 16. The central rigid portion 27, 27' or 27" of valve element 24, 24' or 24", as the case may be, may have a diameter just slightly under two inches, of the order of $1\frac{15}{16}$ inches. The outer portion 28, 28' or 28", may have a diameter of about $2\frac{7}{16}$ inches. The relative sizes of the central portion 27 and the outer portion 28 prevent the possibility that the outer portion 28 will be extruded between the central portion 27 and the valve seat 16, even under extreme pressure. In the operation of such a valve, when flow of paste-like material is in the direction indicated by the arrows shown in passageway 11, pressure is exerted on the right-hand side of valve element 24, causing it to move to the left and into the opening 17 in valve seat 16. First contact between valve element 24 and seat 16 is made by the leading edge 29 of the outer resilient portion 28. Generally, at this point of contact, there will be found somewhere about the circular periphery of element 28 a particle lodged between the leading edge 29 and the valve seat 16. The outer portion 28, being yieldable as a result of being constructed of a resilient material, forms a line-type seal about the particular particle encountered, and further inward movement of valve element 24 results first in a wiping action of outer member 28 on the valve seat 16, and then in a pivoting action of outer portion 28 about this line-type seal. The remaining portion of outer periphery 28, not being involved in particle contact, produces a slightly more prolonged wiping action as valve element 24 approaches a more closely closed position with respect to valve seat 16. At some point intermediate the length of travel of valve element 28 between the conditions depicted in Fig. 1 and those in Figs. 2 and 3, the sharply defined leading edge 29 ceases its wiping action and becomes immobilized. Thereafter, further inward movement of valve element 24 produces a corresponding pivoting action of other portions of the resilient outer portion 28 about this now immobilized, sharply-defined leading edge 29. Further inward movement of valve element 24 ultimately results in bringing the stem end pin 25 into contact with spider 18 so as to limit further inward movement of valve element 24. A plurality of seals is provided by the engagement of outer portion 28 with the inner side walls of opening 17. The forward wall of the outer portion 28 (as best seen in Figs. 2 and 3) is placed in tension by the immobilization of the circular leading edge of this portion so that a circular seal between this forward wall and the side walls of the opening 17 is achieved. The sharply-defined leading edge 29 provides a second seal, this being rearward or external of the seal brought about by the forward wall of outer portion 28. Still further, a third seal is effected by the lateral wall of outer portion 28 when it contacts the internal side walls of opening 17 rearward of the seal developed by sharply-defined leading edge 29. Thus, the bothersome particle, first mentioned in connection with the operation of this valve, is not only sealed along a line across its innermost portion provided by leading edge 29, but is further completely isolated and sealed forwardly and rearwardly by the additional seal achieved through the forward and lateral walls of the outer portion 28.

It is to be appreciated that the phenomenon described above is not an infrequent occurrence when handling pastes containing discrete particles. Conventional valving expedients may function satisfactorily for a short time, but the abrasive action occurring in such expedients through the presence of particles during each valve operation generally renders the previously employed type of valve inoperative in short order.

The resilient outer portion 28 of valve element 24 not only provides the plurality of seals mentioned above, but also is responsible for providing a long and useful life in the operation of this valve. This is achieved through the wiping action referred to above which sweeps out of the way any particles lying inward of the circular leading edge 29.

Satisfactory results are achieved in the operation of the valve just described where the taper of the walls defining the frusto-conical opening 17 and valve seat 16 are disposed at an angle ranging from about 5° to about 45° with respect to the axis of the opening. Even better results and a more compact valve structure are achieved when the inclination of the walls is at an angle of between 20 and 30° with the axis of the opening.

The valve shown produces excellent results in an environment where it is self-actuating, i.e., where the pressure of the fluid it is used to check causes movement of the valve element 24. However, equally satisfactory results can be obtained where the valve element is mechanically moved. In such self-actuating environments as plastering machines, the valve of this invention has been satisfactorily employed in checking the flows of plaster and other cementitious materials under pressures as high as 800 pounds per square inch. The same valve, however, can be satisfactorily actuated by pressures as low as 1 p.s.i.

Another embodiment of the invention employing the teachings described hereinbefore is shown in Figs. 4–8. In the description of this embodiment, like numerals will be employed to designate like parts except for the addition of 100. In Figs. 4–8, the numeral 110 designates generally a valve body which communicates a flow channel 111 with a second channel or chamber designated 111a. A detailed description of such an environment can be seen in the co-owned, copending application of Joseph Kinzelman, Serial No. 703,969, filed December 19, 1957, and reference is hereby made to that application. For example, flow channel 111 may take the form of a cylinder in which a piston (not shown) is reciprocably mounted and attached to a rod 130 (a portion of which is shown in Figs. 4–6).

Mounted within housing 110 which here also provides a valve body, is located a seat designated 116. Mounted for reciprocable motion with respect to housing 110 and therefore valve seat 116 is a valve element designated generally by the numeral 124.

A principal difference between the valve structure seen in Figs. 1–3 and that shown in Figs. 4–8 is that the valve element 124 and the opening 117 in valve seat 116 are annular in nature. However, the mode of operation in such an embodiment is identical with that described in conjunction with Figs. 1–3. Focusing on the external portion of the annular valve element 124, it is seen that again a sharply defined leading edge is provided that cooperates with the tapered side wall of opening 117, the sharply defined leading edge being designated by the numeral 129 in Fig. 4. In effect, therefore, the embodiment of the invention shown in Figs. 4–8 is substantially the same as that shown in Figs. 1–3 with the exception of providing an axially-extending opening in valve element 124 which, in the embodiment of Figs. 4–8, permits the slidable receipt of a piston rod 130.

In the embodiment shown in Figs. 4–8, it is to be noted that a central ring portion 127 is provided in valve element 124, the central portion being constructed of a rigid material such as a metal and which is equivalent to the central portion 27 of Figs. 1–3. In valve element 124, the central portion 127 is provided flush with the extreme forward portion of outer resilient portion 128. Outer resilient portion 128, in the illustration given in Figs. 4–8, is also provided with a beveled corner which positions the sharply defined leading edge 129 somewhat rearwardly of the forward face of central portion 127.

The annular central and outer portions 127 and 128, respectively, of valve element 124, are guided in an axial direction with respect to passages 111 and 111a by means of a cage structure generally designated by the numeral 131. Cage 131 includes a pair of rings 132 and 133 positioned on the opposite sides of valve seat 116 and secured together by means of stems 134. Stems 134 extend between rings 132 and 133 and are united therewith by means of bolts 135. Thus, the stems 134 serve as means for mounting a metallic ring 127 (see Fig. 7). Also mounted on stems 134 between the ring designated 127 and which functions as the central portion of the valve element and the upper ring 131, is a resilient ring designated 128 and which provides the resilient outer portion of valve element 124. In the illustration given in Figs. 4–8, ring 128 is provided with an annular recess in its lower face which receives ring 127. Rings 127 and 128 are provided with spaced openings 136 (best seen in Fig. 7) which permit the receipt of stems 134.

Valve seat 116 (best seen in Fig. 8) is provided with arcuately-elongated openings 117, and intermediate each opening is equipped with a bolt hole 137 which receives a bolt 138 (designated only in Figs. 5 and 6) and thereby secures seat 116 on housing 110. Bolts 138 are provided with enlarged heads 139 at their upper ends which act as stops for the downward movement of valve element 124. The heads are rounded and, in effect, present a point target for the valve element so as to avoid obstruction by a particle. The central portions of valve seat 116 and housing 110 are beveled as at 140 and 141 (designated only in Fig. 6) to provide a recess for the receipt of a seal 142 about piston rod 130.

In the operation of the embodiment shown in Figs. 4-8, and more specifically in Figs. 4-6, upward flow of a paste-like material designated by the arrow in Fig. 4 may be induced by the upward movement of a piston (not shown) affixed to piston rod 130. Downward movement of piston rod 130 and therefore any piston mounted on it, brings about a change in pressure on valve element 124. Increasing pressure on the upper side (Figs. 5 and 6) results in an engagement of valve element 124 with valve seat 116 to close the valve. When the valve closes, paste previously flowing through the openings 117 and around valve element 124 ceases. The valve closes quickly, being slidable relative to piston rod 130 so as to be activated by the first pressure change produced by the rod movement. This condition is shown in Fig. 6, while the open condition of the valve is shown in Fig. 4. It is to be appreciated that the closing action of the valve as demonstrated by the sequence represented by Figs. 4-6 follows exactly that described hereinbefore with respect to Figs. 1-3.

The valve of this invention not only is able to provide satisfactory shut-off of paste flow over an extremely wide range of pressures but is effective also to avoid the straining phenomenon characteristic of previously employed check valves. This feature permits the pumping of paste-like materials considerably stiffer than that previously thought possible. For example, the stiffest Portland cement-Perlite mix which can be satisfactorily handled in many pumping machines is one that has a slump of about four inches. A typical formulation would be:

| | |
|---|---|
| Portland cement _____ lbs__ | 94 |
| Perlite _____ cu. ft.__ | 4 |
| Water _____ gals__ | 8¾ |

Such a mix has a compressive strength of the order of 1800 p.s.i. In machines employing conventional check valves, water is strained out of the mix by the valve so that it is necessary to incorporate additional water. The additional water is strained out of the portion of the mix on one side of the valve, making that portion considerably stiffer. With the stiffness limitation mentioned above, it is apparent that the over-all mix must be considerably less stiff in order to have the portion temporarily depleted of water pumpable at all. I have found that with valves previously employed a mix of the character outlined above must contain at least about ten gallons of water. Such a formulation has a slump of about seven inches and a compressive strength of only about 1000 p.s.i. Thus, the imperfect closures provided by previous valves seriously limited the strength of the paste delivered through the valve.

While in the foregoing specification embodiments of the invention have been set forth in considerable detail for purposes of illustrating the invention, it will be readily apparent to those skilled in the art that numerous changes may be made in those details without departing from the spirit and principles of the invention.

I claim:

In a check valve for a system conducting paste-like materials, a seat member having an opening extending therethrough, one end of said opening being inwardly tapered, a valve element in said opening and comprising a rigid metal member having a perimetric shape conforming to the transverse sectional configuration of the most constricted part of the tapered portion of the passage and being slightly smaller than the most constricted part, a resilient member only secured to the periphery of said rigid member, said resilient member having a periphery concentric to and larger than said rigid member to provide an unsupported annular portion engageable with the wall of said passage, said resilient member having forward and side walls, said forward wall lying only in a plane normal to an axis through said opening and said side wall lying in a plane normal to said forward wall and thereby cooperating with said forward wall to define a sharp leading edge to first engage the wall of said passage, said annular portion being flexible freely rearwardly when engaging said passage wall and pivotable about said engaged leading edge so as to also position portions of said forward and side walls in engagement with said passage wall, and guide means limiting the valve element movement to along the passage axis.

References Cited in the file of this patent

UNITED STATES PATENTS

| | | |
|---|---|---|
| 2,260,381 | Kennon _____ | Oct. 28, 1941 |
| 2,402,713 | Volpin _____ | June 25, 1946 |
| 2,523,864 | Delany _____ | Sept. 26, 1950 |

FOREIGN PATENTS

| | | |
|---|---|---|
| 702,875 | Great Britain _____ | Jan. 27, 1954 |